United States Patent

Greskovich et al.

[11] 4,017,319
[45] Apr. 12, 1977

[54] SI$_3$N$_4$ FORMED BY NITRIDATION OF SINTERED SILICON COMPACT CONTAINING BORON

[75] Inventors: Charles D. Greskovich, Schenectady; Svante Prochazka, Ballston Lake, both of N.Y.

[73] Assignee: General Electric Company, Schenectady, N.Y.

[22] Filed: Jan. 6, 1976

[21] Appl. No.: 646,967

[52] U.S. Cl. .............................. 106/55; 106/73.5; 264/65; 264/66
[51] Int. Cl.$^2$ ................. C04B 35/70; C04B 35/58; F27B 9/10
[58] Field of Search ............ 106/73.5, 55; 264/65, 264/66, 125

[56] References Cited

UNITED STATES PATENTS

| 2,618,565 | 11/1952 | Nicholson | 106/55 X |
| 3,544,486 | 12/1970 | Passmore | 106/55 X |
| 3,649,312 | 3/1972 | Stibbs | 106/55 |
| 3,778,231 | 12/1973 | Taylor | 264/66 X |
| 3,813,252 | 5/1974 | Lipp | 106/55 X |
| 3,819,786 | 6/1974 | May | 106/55 X |
| 3,830,652 | 8/1974 | Gazza | 106/73.5 X |
| 3,839,540 | 10/1974 | Arrol | 106/55 X |
| 3,853,566 | 12/1974 | Prochazka | 106/44 |
| 3,854,189 | 12/1974 | Ezis et al. | 264/125 X |
| 3,887,411 | 6/1975 | Goodyear et al. | 264/65 X |

FOREIGN PATENTS OR APPLICATIONS 974,757   11/1964   United Kingdom ............... 106/55

*Primary Examiner*—Patrick P. Garvin
*Assistant Examiner*—William G. Wright
*Attorney, Agent, or Firm*—Jane M. Binkowski; Joseph T. Cohen; Jerome C. Squillaro

[57] ABSTRACT

A polycrystalline silicon nitride body is produced by shaping a particulate mixture of silicon powder and boron into a green body, sintering the body to a density ranging from 60% to 75% of the theoretical density of silicon, said sintered body having pores which are interconnecting and open to the surface of the body, and reacting said sintered body with gaseous nitrogen to convert it to silicon nitride.

9 Claims, No Drawings

SI₃N₄ FORMED BY NITRIDATION OF SINTERED SILICON COMPACT CONTAINING BORON

The present invention relates to a process for producing novel reaction-bonded silicon nitride articles of high density.

Silicon nitride is a refractory electrical insulator with high strength, hardness, high resistance to thermal shock and consequently, has many potential high temperature applications. The usefulness of this material at high temperatures depends to a large extent on the type of microstructure generated as a result of the nitridation of silicon powder compacts at elevated temperatures.

The conventional method of preparing silicon nitride is by heating silicon powder or compacts between 1250° and 1450° C in nitrogen for times up to and exceeding 100 hours. This method of reaction-sintering or reaction-bonding has a number of disadvantages. Because the particle size of silicon is greater than 10 microns, compacts made from such pure powders cannot be densified by sintering techniques even at temperatures near the dissociation point (T~ 1900° C) of silicon nitride. Fired articles usually contain 20 to 30% porosity even after nearly complete nitridation of the silicon phase and exhibit a modulus of rupture (~2×10⁴ psi) too low for many high temperature applications. High temperature strength, as well as other properties, then could be enhanced if reaction-bonded silicon nitride could be produced with a higher final density. Presently, the only methods of increasing the final density are to increase the density of the "green" compact and/or vary the phase composition. This is accomplished by (1) mixing various size fractions of silicon, (2) mixing various size fractions of silicon and silicon nitride and (3) varying the compacting pressue. In any case, however, fired articles of silicon nitride have densities not exceeding 80% of the theoretical value (3.18 g/cc).

The present invention is a method of producing high density reaction-bonded silicon nitride by using a fine silicon powder which can be densified to any desired density before the nitridation process begins. The ability to densify the silicon powder compact before nitriding enables appreciable flexability in the generation of pore channels of various sizes in the sintered silicon compact, the size and openness of these pores channels being essential for the continuous transport of gaseous nitrogen into the center of the compact.

In copending U.S. patent application Ser. No. 646,969 (RD-8794) entitled "Polycrystalline Silicon Articles Containing Boron By Sintering" filed of even date herewith in the names of Charles D. Greskovich and Joseph H. Rosolowski and assigned to the assignee hereof, and which by reference is incorporated herein, there is disclosed a polycrystalline silicon body produced by forming a particulate mixture of silicon powder having an average particle size less than 3 microns and boron in an amount ranging from 0.1% to 5% by weight of the silicon powder, shaping the particulate mixture into a green body having a density of at least 30% of the theoretical density of silicon and sintering the body to a density of at least 60% of the theoretical density of silicon. In the present invention the sintered product of copending U.S. patent application Ser. No. 646,969 (RD-8794) having a density ranging from 60% to 75% of the theoretical density of silicon is nitrided, i.e. it is reacted with nitrogen to form silicon nitride.

Briefly stated, the present invention is a process for producing a silicon nitride body by nitridation of a polycrystalline sintered body of silicon which comprises forming a particulate mixture of silicon powder having an average particle size of less than 3 microns and boron in an amount ranging from 0.1% by weight to 5% by weight of the silicon powder, shaping the particulate mixture into a green body with a density of at least about 30% of the theoretical density of silicon, and sintering the green body at a temperature ranging from 1250° C to a temperature below the melting point of silicon in an atmosphere which has no significant deteriorating effect on the green body or the resulting sintered body by liquid or solid state sintering to produce a sintered body having a density ranging from 60% to 75% of the theoretical density of silicon, said sintered body having a microstructure with an average grain size ranging from about 0.1 micron to 8 microns and wherein substantially all or all of the pores are interconnecting and open to the surface of the sintered body, and reacting said sintered body with gaseous nitrogen ranging from subatmospheric pressure to superatmospheric pressure at a temperature ranging from 1100° C to a temperature below the melting point of silicon to form a polycrystalline silicon nitride body having a density ranging from 79% to 92% of the theoretical density of silicon nitride and comprised of polycrystalline silicon nitride containing boron-doped silicon in an amount ranging from zero % to 10% by volume of the solid phase of said silicon nitride body and containing a boron nitride phase in an amount of about 0.1% to 8% by volume of the solid phase of said silicon nitride body.

In the present invention, the density of the green body of silicon and that of the sintered body of silicon is given as a fractional density of the theoretical density of silicon. However, the density of the silicon nitride body, i.e. the body produced by nitridation of the polycrystalline sintered body of silicon containing boron, is given as a fractional density of the theoretical density of silicon nitride.

For best results, particles of pure silicon are used in the present invention to produce the sintered body of silicon. These particles may have oxygen adsorbed, or have a thin oxide film on their surfaces. Oxygen is not considered a contaminant since during heat up to sintering temperature it is eliminated as silicon monoxide before sintering in initiated and the resulting sintered product is free of oxygen or may contain oxygen in trace amount which has no significant deteriorating effect on its properties. Usually, the composition of the starting silicon powder is at least about 97% by weight pure silicon with oxygen on its surfaces up to about 3% weight of the composition. For some applications, the starting silicon particles must be free of metallic and non-metallic impurities, other than the oxygen, but for a number of product applications, the starting silicon powder may contain traces of metallic and non-metallic impurities which do not affect the sintering process or the properties of the sintered product deleteriously for the particular application. However, to insure against deleterious effects, the total amount of such impurities should not be greater than 0.05% by weight of the starting silicon powder composition.

The present fine sized starting silicon powder can be prepared by a number of techniques. Generally, chemical techniques are most useful for preparing the silicon powder smaller than 0.5 micron. One technique involves reacting silicon-containing compounds with hydrogen such as the following reactions with silicon tetrachloride and trichlorosilane:

$$SiCl_4(g) + 2 H_2(g) \rightarrow 4 HCl(g) + Si(s)$$

$$SiHCl_3(g) + H_2(g) \rightarrow 3 HCl(g) + Si(s).$$

Additional techniques involve the pyrolytic decomposition of silicon-containing compounds such as the following thermal decompositions of trichlorosilane, silane, silicon tetrachloride and silicon dichloride, respectively:

$$SiHCl_3(g) \rightarrow HCl(g) = Si(s) + Cl_2(g)$$

$$SiH_4(g) \rightarrow Si(s) + 2 H_2(g)$$

$$SiCl_4(g) \rightarrow Si(s) + 2 Cl_2(g)$$

$$2 SiCl_2(g) \rightarrow Si(s) + SiCl_4(g).$$

Generally, in chemical techniques used to produce the present silicon powder, lower reaction or decomposition temperatures ordinarily produce a powder which is significantly more amorphous and finer than that produced at higher temperatures. In a specific reaction or decomposition process for producing the silicon powder, modification of processing steps such as gas flow and/or temperature can be used to modify the characteristics of the silicon powder produced. The silicon powder is recoverable by a number of techniques. For example, as it is formed, it can be deposited on a suitable substrate such as a silica tube from which it can be scraped or it can be caught in a trap and recovered therefrom.

Mechanical techniques are useful for preparing silicon powder ranging from about 0.2 micron to 3 microns. Representative of these techniques is jet milling, wet ball milling and vibratory milling. The silicon powder can be jet milled in air, or preferably, in nitrogen or other inert gas such as argon to prevent excessive oxide formation. Ball milling should be carried out in a non-reactive liquid medium such as ethyl alcohol or benzene. Vibratory milling can be carried out either dry or wet.

The silicon powders produced by chemical or mechanical techniques may contain particulate impurities but can be purified by conventional methods such as by leaching with an appropriate acid such as hydrofluoric acid, a dilute mixture of hydrofluoric and nitric acids, or aqua regia.

The present silicon powder can range in structure from amorphous to crystalline. Preferably, it is amorphous or poorly crystalline, as determined by X-ray diffraction analysis and differential thermal analysis, since shrinkage or densification ordinarily increases with increasing amorphism of the starting silicon powder under identical experimental conditions. In the present invention, a poorly crystalline silicon powder is one having a crystallinity content less than about 50% by volume of the powder.

The present silicon powder has an average particle size of less than 3 microns. Silicon powder having an average particle size larger than 3 microns is not useful because it cannot be densified by sintering in the present process to a density of 60%. Silicon powder having an average particle size less than 0.2 micron is preferred since it provides a larger surface area, and the larger the surface area, the greater is shrinkage or densification of the body during sintering.

In the present process, elemental boron having an average particle size of less than 3 microns is used. Preferably, it is of the same size or finer in size than that of the silicon powder so that a more uniform mixture can be produced promoting the solution of boron in silicon at a faster rate due to the greater surface area of the finer sized boron.

The amount of elemental boron which is useful in the present process ranges from 0.1% by weight to 5% by weight of the silicon, with the particular amount of boron used for the production of the present sintered product having particular properties being determinable empirically. Amounts of boron smaller than 0.1% by weight of the silicon powder provide no significant advantage. Amounts of boron larger than 5% by weight of silicon provide no advantage and may form an excessive amount of $SiB_4$ phase.

Boron enters into solid solution with silicon at a rate which increases with increasing temperatures ranging from about 1200° C to 1350° C, and at a temperature of 1350° C, the solubility limit of boron in an amount of 0.46% by weight of the silicon is reached. At a temperature ranging from about 1390° C up to a temperature below the melting point of silicon, boron forms a liquid eutectic with silicon. At temperatures of 1250° C up to a temperature below the eutectic temperature of about 1390° C, solid state sintering of the compact takes place, and at the eutectic temperature of about 1390° C up to a temperature below the melting point of silicon, liquid state sintering takes place.

Elemental boron is, then, effective as a sintering or densifying aid in the present process when it is in solid solution with the silicon host or matrix at temperatures below the boron-silicon eutectic temperature, and when it creates a liquid phase at temperatures at or above the eutectic temperature but below the temperature at which silicon melts.

X-ray diffraction analysis reveals the lattice parameter of boron doped silicon is always appreciably smaller than that of pure silicon when fired under identical conditions. The smaller lattice parameter of the boron doped sintered material is related to the small atomic radius of boron (0.88 Angstroms) as compared to the atomic radius of the silicon atom which is 1.18 Angstroms.

For solid state sintering, which is carried out at a temperature ranging from 1250° C to a temperature below 1390° C, the preferred amount of boron is the maximum amount of boron which is soluble in the silicon at the sintering temperature and ranges from about 0.1% by weight to 0.46% by weight of the silicon. Specifically, sine boron is increasingly effective as a densifying agent with increasing amounts of boron in solid solution with the silicon host or matrix, the solid state sintering rate of the present green body increases significantly with increasing amounts of boron in solid solution up to the solubility limit. For example, at boron concentrations greater than 0.46% by weight of the silicon at sintering temperatures ranging from 1350° C to below 1390° C, the densification rate tends to level out becoming independent of the amount of boron beyond that point.

For liquid state sintering, which is carried out at a temperature ranging from the bore-silicon eutectic temperature of 1390° C up to a temperature below the temperature at which silicon melts, the amount of boron used should range from about 0.3% by weight to 5% by weight of the silicon, and preferably from about 0.3% by weight to about 0.46% by weight of the silicon. Amounts of boron less than about 0.3% by weight are less satisfactory since they will form a very large volume of liquid phase within a very narrow temperature range frequently leading to complete melting or major deformation of the compact.

In both solid and liquid phase sintering, boron in an amount in excess of about 0.46% by weight of the silicon reacts with the silicon to form a second phase which is $SiB_4$. However, in the present process, some $SiB_4$ phase could precipitate out on very slow cooling from the sintering temperature with amounts of boron ranging down to the minimum amount of 0.1 weight percent of silicon. Specifically, an amount of boron up to 5% by weight of the silicon will produce the $SiB_4$ phase in an amount up to 7.5% by volume of the total solid phase of the sintered body. In the present sintered silicon product, the $SiB_4$ phase is distributed at least significantly or at least substantially uniformly throughout the sintered body. In addition, the $SiB_4$ phase is of a size which is substantially the same or finer than the average particle size of the silicon grains and it is coherently bonded to the silicon matrix.

The boron in solid solution is distributed at least significantly or substantially uniformly throughout the present sintered silicon product. Specifically, boron in solid solution with silicon increases the sintering rate of the compact significantly allowing the use of sintering temperatures lower than those required when no boron is used. Also, boron increases the degree of densification and produces sintered products of a density significantly higher than those produced with no boron under the same conditions. In addition, boron makes possible the densification of larger particle size silicon powder by sintering to a density of at least 60% which, without boron and under identical conditions, cannot be sintered to such density. Since boron retards grain growth and surface diffusion in the silicon compact, it enhances volume diffusion which is responsible for densification during sintering.

For best results, the boron particles should be admixed with the silicon powder to form at least a significantly uniform or at least a substantially uniform mixture. The boron can be admixed with the silicon powder by mechanical techniques or it can be formed in situ. Representative of mechanical techniques is jet milling, wet ball milling and vibratory milling. The particulate mixture can be jet milled in air, or preferably in nitrogen or other inert gas such as argon to prevent excessive oxide formation. Ball milling should be carried out in a non-reactive liquid medium such as ethyl alcohol or benzene. Vibratory milling can be carried out either dry or wet. Alternatively, elemental boron can be introduced, for example, in the gas phase by mixing $B_2H_6$ with $SiH_4$ and pyrolyzing the gaseous mixture to produce a mixture of boron and silicon powder.

A number of techniques can be used to shape the particulate mixture of powders of silicon and boron into a green body. For example, the mixture can be extruded, injection molded, die-pressed, isostatically pressed or slip cast to produce the green body of desired shaped. Any lubricants, binders or similar materials used in shaping the mixture should have no significant deteriorating effect on the properties of the green body or the resulting sintered body and should be completely or substantially completely removable such as by vaporization or leaching before sintering is initiated. Such materials are preferably of the type which evaporate on heating at relatively low temperatures, preferably below 400° C, leaving no significant residue.

The density of the green body can range from about 30% to the maximum attainable, which is generally about 60%. The higher the green density, the greater is the final density achievable in the sintered product Specifically, the green density should be at least 30% to produce a sintered product having a density of at least 60% and a green density of at least 40% is required to produce a sintered product having a density substantially higher than 60%.

In the present process, in the solid state sintering embodiment, since the finer the powder the more it shrinks during sintering, a green body having a density ranging from 30% to 35% must necessarily be composed of silicon powder which has an average particle size less than 0.2 micron but which can range in structure from amorphous to completely crystalline to produce a sintered product having the required density of at least 60%. For solid state sintering, as the density of the green body is increased, silicon powder of correspondingly larger particle size can be used, and in a green body having a density of at least 40%, silicon powder ranging up to a particle size of one micron or less is sinterable to a density of at least 60%.

In the liquid state sintering embodiment of the present process, the silicon powder is less than 3 microns and the green body can have a density of 30%, but preferably, 40%. However, silicon powder having an average particle size ranging from greater than 1 micron up to less than 3 microns can be densified in the present process only by liquid phase sintering to produce a sintered product ranging in density from 60% to 75%.

Sintering is carried out at a temperature ranging from 1250° C to below the melting point of silicon which is about 1410° C. For solid state sintering, as a practical matter, sintering temperature ranges from 1300° to about 1380° C and preferably from 1350° to 1380° C to increase the rate of solid state sintering. The particular sintering temperature is determinable empirically and depends largely on particle size, amount of boron, density of the green body, and final density desired in the sintered product, with higher final densities requiring higher sintering temperatures. Specifically, the smaller the size of the particles in the green body and the higher its density, the lower is the required sintering temperature. Sintering temperatures lower than 1250° C do not produce the present sintered bodies with a density of at least 60%.

Sintering of the green body is carried out in an atmosphere in which it is substantially inert, i.e. an atmosphere which has no significant deteriorating efect on its properties such as, for example, argon, helium or a vacuum. The sintering atmosphere can range from a substantial vacuum to atmospheric pressure, but as a practical matter, it is preferably at atmospheric pressure. Preferably, the sintering atmosphere is a flowing atmosphere. However, generally for relatively small pieces, the present sintering can be carried out in stagnant atmospheres or in closed systems.

The polycrystalline sintered body of the present invention has a density ranging from 60% to 75% and consists essentially of silicon and boron in solid solution with the silicon, or it consists essentially of silicon with boron in solid solution with the silicon and an $SiB_4$ phase. The silicon grains are equiaxed or substantially equiaxed and have an average grain size ranging up to about 8 microns. The grains are of significantly or substantially uniform size and are distributed at least significantly or at least substantially uniformly throughout the sintered body. The pores, have an average size, i.e., pore diameter, ranging up to about 10 microns and are of significantly or substantially uniform size and are distributed at least significantly or at least substantially uniformly throughout the body. In the preferred embodiment of the present invention, the grains and pores of the sintered body are of about the same size or generally within a factor of two.

The particular average grain size of the sintered body depends largely on the average particle size of the silicon powder, the density of the green body and sintering temperature. In the preferred embodiment, the polycrystalline sintered body has an average grain size and an average pore size of about 1 micron or smaller. Specifically, silicon powder having an average particle size less than 0.1 micron shaped into a green body having a density of at least 30% produces a sintered product having an average grain size as well as an average pore diameter of about 0.5 micron or smaller, i.e. as small as about 0.1 micron, when the sintering temperature is not higher than 1375° C. On the other hand, silicon powder having an average particle size ranging from 0.1 micron to less than 0.2 micron shaped into a green body having a density of at least 30% and sintered below 1390° C produces a sintered product having an average grain size ranging from 1 micron to 8 microns, and usually from 1 micron to 6 microns.

When the polycrystalline sintered body of silicon has a density ranging from 60% to about 75% of the theoretical density of silicon, all or substantially all of the pores, i.e., at least 90% by volume of the pores of the sintered body of silicon, are interconnecting and of open porosity, i.e., open to the surface of the sintered body.

In the present process the green bodies having a density higher than 58% should be densified during sintering by at least 2% to produce a sintered body with a minimum density higher than 60%. For example, a 60% dense green body should be sintered to a density of at least 62%. Such densification is necessary to get sufficient development of the microstructure for satisfactory reaction with nitrogen. Specifically, in addition to imparting significant mechanical strength to the body, such densification rounds off the pores and makes them more uniform in size and more uniformly distributed throughout the body permitting nitrogen gas to be transported and permeated throughout the body substantially more uniformly and at a rate substantially faster than that in the unsintered compact or green body where the pores are more non-uniform and irregularly shaped and frequently non-uniformly distributed in the body thereby retarding the rate of penetration of nitrogen gas into the interior of the compact. Such retardation of nitrogen causes sufficient formation of silicon nitride to block the pores in the outer surface areas of the body before the nitrogen can reach the central portion of the body thereby leaving a significant or substantial fraction of the silicon unreacted.

The nitridation of the present sintered body of silicon, i.e. the present sintered body of silicon containing boron, is carried out in an atmosphere of gaseous nitrogen which passes the open interconnecting pores to react with silicon forming silicon nitride. The atmosphere is generally a flowing atmosphere to replenish consumed nitrogen. The nitrogen gas atmosphere is generally at atmospheric pressure but it can range in pressure from subatmospheric pressures as low as about 0.01 atmosphere to superatmospheric pressure of about 50 atmospheres. The use of pressurized nitrogen and carrying out the reaction at superatmospheric pressure accelerates nitridation.

In carrying out the process, it is advantageous to react the silicon with nitrogen at a relatively low temperature and then continue the reaction at a higher temperature. Specifically, an initial nitridation is preferably carried out at lower reaction temperatures, i.e., about 1100° C to 1300° C, to convert a substantial portion of the silicon to silicon nitride, which generally is a conversion of at least about 80% by weight of silicon to silicon nitride which is equivalent to silicon nitride in an amount of about 82% by volume of the solid phase of the nitrided body. The lower reaction temperatures produce silicon nitride at a rate slower than at higher reaction temperatures but permit penetration of nitrogen gas to the central portion of the body by insuring against too fast of a reaction rate at the outer surface zone of the body where much formation of silicon nitride could seal off the pores preventing additional penetration of nitrogen gas. The remaining or final nitridation can then be carried out in a higher temperature range, i.e., above 1300° C to a temperature below the melting point of silicon to accelerate the reaction.

In one embodiment of the present invention, an initial nitridation of the sintered silicon body is carried out at a temperature ranging from 1100° C up to a temperature below the melting point of silicon and the final nitridation is carried out at a temperature above the melting point of silicon ranging up to a temperature of 1500° C. Since the initial nitridation converts a substantial portion of the silicon to silicon nitride, the specific amount being determinable empirically, the remaining grains of silicon are usually encapsulated with a layer of silicon nitride. Therefore, at these temperatures above the melting point of silicon, the silicon usually melts and converts to silicon nitride before it can pass through the encapsulating layer of silicon nitride. However, temperatures above 1500° C are not useful because large pores form in the body during nitridation and the liquid silicon apparently reacts rapidly with nitrogen forming silicon nitride and closing off the pores in the body.

The particular period of time to carry out the reaction of the silicon with nitrogen gas, i.e., the nitridation reaction, is determinable empirically and depends largely on the surface area of the pores, the largeness of the silicon grains in the structure, the pressure of the nitrogen atmosphere, the nitriding temperature and the specimen thickness. For example, for a sintered silicon body composed of 0.2 micron average sized grains and pores, and having a thickness of 3 millimeters, and by using nitrogen gas at atmospheric pressure, initial nitridation carried out at 1340° C can take about one day and final nitridation carried out at a temperature of about 1400° C can take another day.

If desired, the present process can be carried out in a single step. Specifically, this comprises shaping the silicon powder into a green body, sintering the body in an atmosphere of nitrogen to a density ranging from 60% to 75% of the theoretical density of silicon, followed by reaction of the resulting sintered body with nitrogen. Since the nitridation step is substantially slower than the sintering step, the sintered product forms before any significant nitridation takes place.

Once the nitridation of the sintered silicon body begins, there is no further change in the dimensions of the article. However, the volume change on conversion of silicon to silicon nitride is +22%, which signifies this volume increase is accommodated by the available porosity, i.e., the pore channels. This means that there is a 22% increase in the volume occupied by one mole of Si in $Si_3N_4$ as compared to the in Si. Specifically, molar volumes $(V_m)_{Si}$ and $(V_m)$ and $(V_m)_{Si_3N_4}$ occupied by one mole of Si and one mole of $Si_3N_4$, respectively, are determined from the gram molecular weights divided by the respective densities as follows:

$$(V_m)_{Si} = \frac{M}{\rho} = \frac{28.086 \text{ g/mole}}{2.33 \text{ g/cc}} = 12.05 \text{ cc/mole Si}$$

$$(V_m)_{Si_3N_4} = \frac{M}{\rho} = \frac{140.105 \text{ g/mole}}{3.18 \text{ g/cc}} = 44.08 \text{ cc/mole Si}_3\text{N}_4$$

which gives on a per mole of Si basis 14.69 cc/mole Si in $Si_3N_4$, and $$\frac{\Delta V_m}{(V_m)_{Si}} = \frac{2.64 \text{ cc/mole}}{12.05 \text{ cc/mole Si}} = 22\%.$$

This means that the maximum increase in density that the present sintered silicon body can undergo after full nitridation, i.e., after complete conversion to $Si_3N_4$, is 22%.

In most cases open porosity (or pore channels) tend to pinch off or close at porosity levels near 10% by volume of the nitrided body. This means that the optimum density of the sintered silicon compact before nitriding should be near 70% of the theoretical value of silicon so that after nitriding, the final density of the silicon nitride body should be near 90% of the theoretical value or i.e., 10% porosity, leaving unreacted silicon in an amount of less than about 2 percent by volume of the solid phase of said body with the remainder of the solid phase being polycrystalline silicon nitride.

The present sintered silicon body consists essentially of silicon and boron in solid solution with the silicon, or it consists essentially of silicon and boron in solid solution with the silicon and an $SiB_4$ phase, said boron in solid solution ranging from 0.1% by weight to 0.46% by weight of said silicon, and said $SiB_4$ phase being present in an amount ranging up to 7.5% by volume of the total solid phase of said sintered body.

During nitridation of this sintered silicon body, all or substantially all of the boron, i.e. at least 99.9% by weight of the boron, that is the boron in solid solution as well as in the $SiB_4$ phase, reacts with nitrogen to form a boron nitride phase. The boron nitride phase is distributed at least significantly uniformly throughout the silicon nitride body. Also, when the boron is present in the sintered silicon body in an amount ranging up to about 1% by weight of silicon, it will form finely dispersed particles of boron nitride less than about 1 micron in size. However, when the amount of boron ranges from 1% to 5% by weight of the silicon, the resulting boron nitride phase will have a grain size larger than about 1 micron and generally will range in size from about 1 micron to 5 microns.

The polycrystalline silicon nitride body of the present invention has a density ranging from 79% to 92% of the theoretical density of silicon nitride. It is comprised of polycrystalline silicon nitride containing a boron nitride phase, BN, in an amount of 0.1% to 8% by volume of the solid phase of the silicon nitride body, or it is comprises of polycrystalline silicon nitride containing unreacted, i.e., non-nitrided, boron-doped silicon in an amount ranging from 0% to 10% by volume of the solid phase of the silicon nitride body, and the boron nitride phase in an amount of 0.1% to 8% by volume of the solid phase of the silicon nitride body. The silicon nitride grains have an average grain size ranging from about 0.2 micron to about 12 microns, and generally from about 0.5 micron to about 5 microns. The unreacted boron-doped silicon that may remain in the nitrided body can be in the form of boron-doped silicon grains alone, or more likely, as boron-doped silicon grains encapsulated with a layer of silicon nitride and, depending on experimental conditions, perhaps boron nitride. Both forms of unreacted silicon grains have an average grain size ranging from about 0.1 micron to about 6 microns. In addition, when boron-doped silicon is present, there may also be present grains of $SiB_4$ phase in minor amount by volume of the solid phase of the silicon nitride body. The amount of boron which remains dissolved in the unreacted silicon, i.e., the boron-doped silicon, as well as the amount of $SiB_4$ phase which may remain, depends on the composition of the sintered silicon body before nitriding and the extent of nitridation. A polycrystalline silicon nitride body containing unreacted boron-doped silicon in an amount significantly larger than 10% by volume of the solid phase of the nitride body is not especially useful since such amounts tend to weaken the body significantly.

The polycrystalline silicon nitride body of the present invention is always a mixture of $\alpha$-$Si_3N_4$ and $\beta$-$Si_3N_4$. At nitriding temperatures at or below 1350° C, the major phase is $\alpha$-$Si_3N_4$. However, at temperatures higher than 1350° C, the $\alpha$-$Si_3N_4$ phase becomes more predominant.

The present invention provides a number of advantages. For example, with standard powder processing techniques, large shapes (plates, disks, boats, crucibles, tubes) and sizes can be fabricated during the powder compaction step before sintering so that machining costs are minimized or virtually absent.

The present invention makes it possible to fabricate complex shaped articles of polycrystalline silicon nitride with improved microstructure over existing silicon nitride materials made by reaction bonding techniques. Specifically, the present sintered product can be made in the form of a useful shaped article such as a crucible, a thin walled tube, a long rod, a spherical body, or a hollow shaped article. The dimensions of the present sintered product differ from those of its green body by the extent of shrinkage, i.e. densification, In addition, the present invention provides nitridation rates of silicon substantially higher than heretofore. The rates, at atmospheric pressure, i.e., a conversion of about 80% by weight of the silicon to silicon nitride in a day, or the nitrogen atmosphere at superatmospheric pressure in significantly less than one day, are caused by the high surface area and interconnecting pore structure of the sintered silicon body. Also, the present nitridation rates are possible without the use of temperatures at or above the melting point of silicon which ordinarily would have to be used.

The invention is further illustrated by the following examples wherein the procedure was as follows unless otherwise stated:

The silicon powder was prepared by the thermal decomposition of silane, SiH$_4$, at temperatures near 700° C in a gradient furnace comprised of an open-ended fused silica tube passing through a furnace. The following reaction takes place:

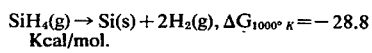

$$SiH_4(g) \rightarrow Si(s) + 2H_2(g), \Delta G_{1000° K} = -28.8 \text{ Kcal/mol.}$$

The source of silane was a 4% silane + 96% helium gaseous mixture which was flowed into the tube most of which, except for the open end portions, was located inside the furnace. The tube was thoroughly flushed with argon before the introduction of the gaseous mixture into the hot tube. The silicon powder (or smoke) deposited on the inner wall of the tube. The powder was scraped from the wall and characterized by X-ray diffraction and SEM analyses, surface area measurements and sintering experiments.

Specifically, the silicon powder was prepared by using a gas flow rate of 0.5 standard cubic feet per hour (SCFPH) and a maximum furnace temperature of 700° C. The color of the powder was dark brown. Since the powder was prepared in a temperature gradient furnace, it was believed to be inhomoeneous with respect to particle size, morphology and crystallinity. Therefore, the powder was given an isothermal anneal at 700° C in flowing argon for 60 minutes. After the annealing treatment, the color of the powder turned light brown. X-ray diffraction analysis showed that the powder was amorphous in the "as-prepared" form but partly or poorly crystalized after the isothermal anneal at 700° C. The annealed powder, which was used in all of the sintering experiments was greater than 99.5% by weight pure silicon with the major impurity being oxygen and it had a specific surface area of 43.5 m$^2$/g, which corresponds to an average particle size of 0.06 microns.

A substantially uniform powder mixture of a portion of the annealed silicon powder and elemental boron powder, in an amount of 0.46% by weight of the silicon powder, was prepared by admixing boron having an average particle size of about 0.01 micron with the silicon powder in acetone in a closed plastic bottle on a mixer mill for 30 minutes. The resulting mixture was dried in air at a temperature of about 110° C.

Powder compacts were preshaped from the annealed powder, or powder mixture, without binders into disks in a double-acting Carboloy die at 5000 psi and then hydrostatically pressed at 30,000 psi. The green bodies, i.e., disks, were substantially of the same size, about 1.6 cm × 3.0 cm, and each had a green density of about 47% of the theoretical density of silicon.

The sintering and nitriding steps were done in a platinum wound resistance furnace having an Al$_2$O$_3$ insert tube.

The sintering atmosphere was flowing prepurified argon using a gas flow rate of 2 SCFPH.

Nitriding, i.e. the reaction with nitrogen, was carried out at atmospheric pressure in an atmosphere of flowing nitrogen gas using a gas flow rate of 2 SCFPH.

All of the silicon nitride bodies were furnace cooled in the nitrogen atmosphere to room temperature.

EXAMPLE 1

A silicon powder disk, i.e., the green body containing boron, was sintered in argon at a temperature of 1250° C for 1 hour to a density of about 65%.

Nitrogen was then substituted for the argon atmosphere. The sintered disk was held in the nitrogen for 0.5 hour and the temperature was then raised to 1340° C where it was held for 5 hours.

The resulting polycrystalline silicon nitride body showed a conversion of about 75% by weight of the silicon to silicon nitride. The silicon nitride body had an average pore size and an average grain size of less than one micron and smaller, which was below the resolving power of the optical microscope.

EXAMPLE 2

A silicon powder disk, i.e., the green body without boron, was sintered and nitrided in the same manner as set forth in Example 1.

The resulting polycrystalline silicon nitride body showed a conversion of only 50% by weight of the silicon to silicon nitride. Compared to Example 1, this indicates that boron enhances the nitridation reaction significantly.

EXAMPLE 3

Should the nitridation of the nitride body of Example 1 be continued for longer times, up to 100 hours, at 1340° C, the resulting polycrystalline silicon nitride body should have a density of about 85% of the theoretical density of silicon nitride. Also, it should have an average silicon nitride grain size of less than 5 microns and it should be comprised of silicon nitride in an amount of about 93% by volume of the solid phase of the silicon nitride body and should contain unreacted boron-doped silicon in an amount of about 7% by volume of the solid phase of the nitride body as well as minor amount of the BN phase.

The following U.S. patent applications are incorporated herein by reference:

In copending U.S. patent application, Ser. No. 646968 (RD-8644) entitled "Polycrystalline Silicon Articles By Sintering" filed of even date herewith in the names of Charles D. Greskovich and Joseph H. Rosolowski and assigned to the assignee hereof there is disclosed a polycrystalline silicon body produced by shaping silicon powder having an average particle size less than 0.2 mircon into a green body having a density of at least 30% of the theoretical density of silicon and sintering the body to a density of at least 60% of the theoretical density of silicon, and which by reference, is incorporated herein.

In copending U.S. patent application Ser. No. 646764 (RD-8432) entitled "Si$_3$N$_4$ Formed By Nitridation Of Sintered Silicon Compact" filed of even date herewith in the names of Charles D. Greskovich and Svante Prochazka and assigned to the assignee hereof, there is disclosed a dense polycrystalline silicon nitride body produced by nitridation of a polycrystalline sintered silicon article of certain density.

What is claimed is:
1. A process for producing a polycrystalline silicon nitride body by nitridation of a polycrystalline sintered body of silicon which comprises forming a particulate mixture of silicon powder and boron, said silicon pow- der and said boron having an average particle size less than 3 microns, said boron being present in an amount ranging from 0.1% by weight to 5% by weight of said silicon powder, shaping said mixture into a green body having a density of at least 30% of the theoretical density of silicon, an sintering the green body at a temperature ranging from 1250° C to a temperature below the melting point of silicon in an atmosphere which has no significant deteriorating effect on the green body or the resulting sintered body to produce a sintered body having a density ranging from 60% to 75% of the theoretical density of silicon, said sintering densifying said green body in an amount of at least 2%, and nitriding said sintered body by reacting it in a gaseous nitrogen atmosphere ranging from subatmospheric pressure to superatmospheric pressure at a temperature ranging from 1100° C to below the melting point of silicon to form a polycrystalline silicon nitride body having a density ranging from 79% to 92% of the theoretical density of silicon nitride and comprised of polycrystalline silicon nitride containing a boron nitride phase in an amount of 0.1% to 8% by volume of the solid phase of said silicon nitride body, and containing unreacted boron-doped silicon in an amount ranging from zero % to 10% by volume of the solid phase of said silicon nitride body.

2. A process for producing a polycrystalline silicon nitride body according to claim 1 wherein said silicon powder has an average particle size less than 0.2 micron.

3. A process for producing a polycrystalline silicon nitride body according to claim 1 wherein said nitriding is carried out initially at a temperature ranging from about 1100° C to 1300° C to convert a substantial amount of silicon to silicon nitride and continuing the nitriding at a temperature ranging from above 1300° C to a temperature below the melting point of silicon.

4. A process for producing a polycrystalline silicon nitride body according to claim 1 wherein said nitriding is carried out initially at a temperature ranging from 1100° C to a temperature below the melting point of silicon to convert a substantial amount of silicon to silicon nitride and continuing said nitriding at a temperature ranging from a temperature above the melting point of silicon to 1500° C.

5. A process for producing a polycrystalline silicon nitride body according to claim 1 wherein said sintering is carried out in nitrogen.

6. A process for producing a polycrystalline silicon nitride body according to claim 1 wherein said gaseous nitrogen atmosphere is at atmospheric pressure.

7. A polycrystalline silicon nitride body consisting essentially of polycrystalline silicon nitride, boron-doped silicon having an average grain size ranging from about 0.1 micron to about 6 microns in an amount ranging from 0% to 10% by volume of the solid phase of said silicon nitride body, and a boron nitride phase ranging in size from less than about 1 micron to 5 microns in an amount of 0.1% to 8% by volume of the solid phase of said silicon nitride body, said silicon nitride body having a density ranging from 79% to 92% of the theoretical density of silicon nitride, the silicon nitride grains of said body having an average grain size ranging from about 0.2 microns to about 12 microns.

8. A polycrystalline silicon nitride body according to claim 7 wherein said boron-doped silicon is present in an amount of less than about 5% by volume of the solid phase of said body and said body has a density of about 90% of the theoretical density of silicon nitride.

9. A polycrystalline silicon nitride body according to claim 7 wherein said silicon nitride grains have an average grain size ranging from about 0.5 micron to about 5 microns.

* * * * *